United States Patent [19]

Andrews

[11] 4,404,356
[45] Sep. 13, 1983

[54] HEAT-CURABLE EPOXIDE RESIN COMPOSITIONS

[75] Inventor: Christopher M. Andrews, Cambridge, England

[73] Assignee: Ciba-Geigy Corporation, Ardsley, N.Y.

[21] Appl. No.: 412,740

[22] Filed: Aug. 30, 1982

[30] Foreign Application Priority Data

Sep. 9, 1981 [GB] United Kingdom ............ 8127233
Dec. 11, 1981 [GB] United Kingdom ............ 8137555

[51] Int. Cl.³ .................. C08G 59/44; C08G 59/46
[52] U.S. Cl. ................... 528/99; 525/504; 528/96; 528/119
[58] Field of Search ............ 528/96, 99, 119; 525/504

[56] References Cited

U.S. PATENT DOCUMENTS

| | | | |
|---|---|---|---|
| 2,795,610 | 6/1957 | Gerjovich | 260/553 |
| 3,294,749 | 12/1966 | Pratt | 260/47 |
| 3,386,956 | 6/1968 | Nawakowski et al. | 260/47 |
| 3,660,316 | 5/1972 | Schaefer et al. | 260/2 H |
| 3,759,914 | 9/1973 | Simms et al. | 260/37 EP |
| 3,956,237 | 5/1976 | Dooraklan et al. | 260/47 EP |
| 4,283,520 | 8/1981 | Moser et al. | 528/93 |

FOREIGN PATENT DOCUMENTS 1293142 6/1972 United Kingdom .

OTHER PUBLICATIONS

Derwent CPI Abstract No. 50727c/29 (1980).

*Primary Examiner*—Earl A. Nielsen
*Attorney, Agent, or Firm*—Harry Falber

[57] ABSTRACT

Epoxide resins are cured by heating with a hydroxyphenylurea of formula

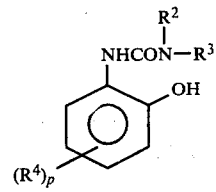

where $R^2$ and $R^3$ each represent a (cyclo)alkyl, (cyclo)alkenyl, or aralkyl group, optionally substituted by —OH, —CN, or a halogen atom, with the proviso that $R^2$ may also represent —H, or $R^2$ and $R^3$ together with the indicated attached N atom represent a heterocyclic radical, $R^4$ denotes —$NH_2$, —$NO_2$, —Cl, —Br, or alkyl, and p denotes zero, 1, or 2. Such hydroxyphenylureas may be used alone, as accelerators for heat-curing with other agents such as dicyandiamide, melamine, and carboxylic acid hydrazides, or may be used as the primary curing agent with promoters such as dicyandiamide, melamine, and carboxylic hydrazides.

9 Claims, No Drawings

HEAT-CURABLE EPOXIDE RESIN COMPOSITIONS

BACKGROUND OF THE INVENTION

This invention relates to heat-curable epoxide resin compositions, to a process for their cure, and to cured products obtained by this process.

It is known that epoxide resins, i.e., substances containing on average more than one 1,2-epoxide group per molecule, may be cured by reaction with various classes of substances to form cross-linked, infusible, insoluble products having valuable technical properties.

U.S. Pat. No. 3,386,956 discloses the curing of epoxide resins by means of ureas represented by the following formulae

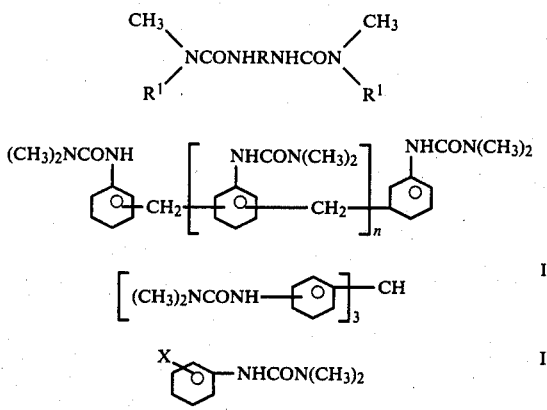

wherein

R represents a divalent radical selected from the group consisting of methyl-substituted phenylene, methylenediphenylene, dimethoxydiphenylene, and dimethyldiphenylene, $R^1$ represents methyl or hydroxyethyl, n is an integer of from 2 to 5, and X represents $-OCH_3$, $-Cl$, $-H$, $-CH_3$, or $-NO_2$.

The United States patent also discloses that the curing effect of these agents may be promoted by incorporating dicyandiamide, stearic hydrazide, adipic dihydrazide, succinimide, or cyanoacetamide in the curable compositions.

According to that patent, use of the aforesaid ureas overcomes a difficulty associated with curable epoxide resin compositions of the prior art, namely, that relatively high temperatures and relatively long curing times were needed if curing agents such as dicyandiamide were used, whereas if other, more reactive, curing agents or accelerators were used they caused premature curing at room temperature, i.e., they were not sufficiently latent.

U.S. Pat. No. 3,660,316 discloses that 1-cyano-3-(lower alkyl)-guanidines also promote the curing of epoxide resins by bisureas of formula II to IV.

Ureas of the foregoing formulae, in particular N-(4-chlorophenyl)-N',N'-dimethylurea and 2,4-bis(N,N-dimethylureido)toluene, have been used commercially to cure epoxide resins, alone or with dicyandiamide as promoter, but also as promoters of the curing of epoxide resins with dicyandiamide.

However, because of increasingly severe requirements for curable compositions having long storage lives at room temperature but curing rapidly at moderately elevated temperatures (e.g., 100° C.), replacements for the above-mentioned ureas are now being sought.

We have now found that certain phenolic ureas substantially meet these more stringent requirements.

SUMMARY OF THE INVENTION

This invention accordingly provides heat-curable compositions comprising
(a) an epoxide resin and
(b) an effective amount of a urea of formula

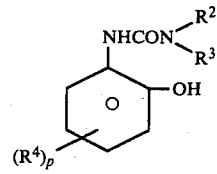

where $R^2$ and $R^3$ each denote an alkyl, cycloalkyl, alkenyl, cycloalkenyl, or aralkyl group, which may be substituted by a halogen atom (preferably a chlorine atom) or by a hydroxyl or cyano group, with the proviso that $R^2$ may alternatively denote a hydrogen atom, or $R^2$ and $R^3$ together with the indicated attached nitrogen atom denote a heterocyclic ring containing 3 to 5 carbon atoms, and optionally one oxygen atom, in the ring, $R^4$ denotes $-NH_2$, $-NO_2$, $-Cl$, $-Br$, or alkyl of 1 to 10 carbon atoms, and p denotes zero, 1, or 2.

There are further provided a process for curing epoxide resins comprising heating the heat-curable compositions of this invention and cured epoxide resins obtained by this process.

An advantage of N-(2-hydroxyphenyl)-N',N'-dimethylurea and other ureas of formula V over N-(4-chlorophenyl)-N',N'-dimethylurea and 2,4-bis(N,N-dimethylureido)toluene is that they dissolve in the more commonly used epoxide resins such as 2,2-bis(4-(glycidyloxy)phenyl)propane and bis(4-(diglycidylamino)phenyl)methane on heating with them at temperatures up to 90° C., especially at 60° to 80° C., to form stable solutions which do not gel for 3 to 4 weeks at 40° C. and which have a storage life of more than 3 months at room temperature (20° to 25° C.). In the case of the abovementioned two ureas previously employed for this purpose it is necessary, in order to form a solution, to heat the epoxide resin to temperatures of 100° to 120° C., which is apt to cause premature gelation of the mixture.

DETAILED DISCLOSURE

In formula V, $R^2$ and $R^3$ each preferably denote an alkyl group of 1 to 6 carbon atoms, a hydroxyalkyl group of 2 to 4 carbon atoms, a cycloalkyl group of 3 to 7 carbon atoms, an alkenyl group of 2 to 4 carbon atoms, or an aralkyl group of 7 to 9 carbon atoms. Specific examples of suitable groups $R^2$ and $R^3$ are methyl, ethyl, n-propyl, tert.butyl, cyclohexyl, 4-methylcyclohexyl, allyl, 2-hydroxyethyl, and benzyl. Particularly preferred are such compounds where $R^2$ and $R^3$ each denote methyl or where $R^2$ denotes methyl and $R^3$ denotes 2-hydroxyethyl; they are particularly effective accelerators for dicyandiamide. When $R^2$ and $R^3$ together with the indicated attached nitrogen atom denote a heterocyclic ring it may be for example a piperidino, morpholino, or pyrrolidino ring, i.e., $R^2$ and $R^3$ together with the nitrogen atom represent a group of formula

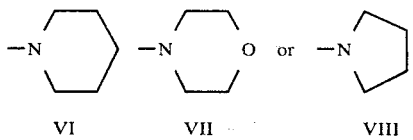

VI   VII   VIII

Compounds where $R^2$ and $R^3$ are each other than methyl and other than where $R^2$ denotes methyl and $R^3$ denotes 2-hydroxyethyl are less reactive towards epoxide resins and so are useful as heat-curing agents, e.g., for making castings, where occurrence of a too rapid curing action (and evolution of considerable heat of reaction) may be deleterious.

Preferably p denotes zero, or 1 with $R^4$ denoting $-NO_2$, $-Cl$, or $-Br$, or 2 with each $R^4$ denoting a methyl group.

Especially preferred compounds of formula V are N-(2-hydroxyphenyl)-N',N'-dimethylurea, N-(2-hydroxy-4-nitrophenyl)-N',N'-dimethylurea, N-(4-chloro-2-hydroxyphenyl)-N',N'-dimethylurea, N-(5-chloro-2-hydroxyphenyl)-N',N'-dimethylurea, N-(2-hydroxy-5-nitrophenyl)-N',N'-dimethylurea, N-(3,5-dimethyl-2-hydroxyphenyl)-N',N'-dimethylurea, N-(2-hydroxyphenyl)-N'-methyl-N'-(2-hydroxyethyl)urea, and N-(4-chloro-2-hydroxyphenyl)-N'-methyl-N'-(2-hydroxyethyl)urea.

The compositions may contain a heat-curing amount of (b), i.e., a urea of formula V is the sole curing agent. In such cases there will usually be employed from 3 to 25, preferably 5 to 20, parts by weight of (b) per 100 parts of the epoxide resin (a).

Hydroxyphenylureas (b) are in general a known class of compound, those of formula V where $R^4$ denotes $-CH_3$ or $-NO_2$, p denotes zero, 1, or 2, and $R^2$ and $R^3$ each denote an aliphatic group of 1 to 4 carbon atoms (with the proviso that one may denote a hydrogen atom) having been described in U.S. Pat. No. 2,795,610 as fungicides, protozoicides, and algaecides. They may be prepared by heating a benzoxazolinone of formula

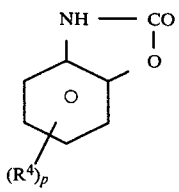

IX with a primary or secondary amine of formula

X where $R^2$, $R^3$, $R^4$, and p have the meanings assigned above, such as methylamine, dimethylamine, diethylamine, N-methylbenzylamine, piperidine, morpholine, pyrrolidine, diallylamine, N-methylcyclohexylamine, and N-methylethanolamine, following the method described in the United States patent. The benzoxazolinone is in turn obtainable in a known manner by heating an appropriately substituted o-aminophenol with urea or by nitration, chlorination, or bromination of benzoxazolinone itself. However, if it is desired to employ a compound of formula V where $R^4$ denotes an amino group then this is better prepared by making the corresponding nitro-substituted benzoxazolinone and reducing it.

We have further found that dicyandiamide, melamine, carboxylic acid hydrazides, and certain other compounds promote the heat-curing of epoxide resins with ureas of formula V.

There are thus also provided heat-curable compositions according to this invention which contain in addition (c) a minor amount by weight, calculated on the weight of (b), of an accelerator for the heat-curing, selected from dicyandiamide, carboxylic acid hydrazides, succinimide, cyanoacetamide, 1-cyano-3-(lower alkyl)guanidines, the lower alkyl group or groups containing up to 3 carbon atoms, imidazoles, and salts of carboxylic acids with tertiary amines, (b) with (c) together constituting a heat-curing amount for (a), typically together comprising 5 to 25 parts by weight per 100 parts by weight of the epoxide resin (a).

We have also found that ureas of formula V accelerate the heat-curing of epoxide resins with dicyandiamide, melamine, carboxylic acid hydrazides, and certain other compounds.

There are thus further provided heat-curable compositions according to this invention which contain in addition (d) a major amount, calculated on the weight of (b), of a heat-curing agent for epoxide resins selected from dicyandiamide, melamine, carboxylic acid hydrazides, succinimide, cyanoacetamide, 1-cyano-3-(lower alkyl)-guanidines, the lower alkyl group or groups containing up to 3 carbon atoms, imidazoles, and salts of carboxylic acids with tertiary amines, (d) with (b) together constituting a heat-curing amount for (a), typically together comprising 5 to 25 parts by weight per 100 parts by weight of the epoxide resin (a).

Epoxide resins which may be employed in these compositions are preferably those containing at least two groups of formula

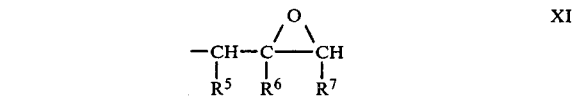

XI directly attached to an atom or atoms of oxygen, nitrogen, or sulphur, where either $R^5$ and $R^7$ each represent a hydrogen atom, in which case $R^6$ denotes a hydrogen atom or a methyl group, or $R^5$ and $R^7$ together represent $-CH_2CH_2-$, in which case $R^6$ denotes a hydrogen atom.

As examples of such resins may be mentioned polyglycidyl and poly($\beta$-methylglycidyl)esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene)-glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Examples of epoxide resins having groups of formula XI where $R^5$ and $R^7$ conjointly denote a —$CH_2CH_2$— group are bis(2,3-epoxycyclopentyl)ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are polyglycidyl ethers, polyglycidyl esters, N,N'-diglycidylhydantoins, and poly(N-glycidyl) derivatives of aromatic amines. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, and p-(diglycidylamino)phenyl glycidyl ether.

When the accelerator (c) or the major curing agent (d) is a carboxylic acid hydrazide it is preferably stearic acid hydrazide, oxalic acid dihydrazide, adipic acid dihydrazide, sebacic acid dihydrazide, or isophthalic acid dihydrazide.

When the accelerator (c) or the major curing agent (d) is a 1-cyano-3-(lower alkyl)guanidine it is preferably the 3-methyl, 3,3-dimethyl, or 3,3-diethyl compound.

When the accelerator (c) or the major curing agent (d) is an imidazole it is preferably 2-phenylimidazole, N-methylimidazole, or 2-ethyl-4-methylimidazole.

When the accelerator (c) or the major curing agent (d) is a salt of a carboxylic acid with a tertiary amine it is preferably the salt of a hydroxycarboxylic acid, such as lactic acid or salicylic acid, with a Mannich base such as 2,4,6-tris(dimethylaminomethyl)phenol.

Normally the accelerator (c) will be present in a proportion of 10 to 50 parts by weight per 100 parts by weight of the urea (b), and the urea (b), when used as accelerator for the hardening agent (d), will be present in a proportion of 25 to 75 parts by weight per 100 parts by weight of (d).

The new compositions may further contain suitable plasticisers such as dibutyl phthalate and dioctyl phthalate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate, and glycidyl methacrylate. They may also contain additives such as fillers, reinforcing materials, polymeric toughening agents such as polyether sulphones, phenoxy resins, and butadiene-acrylonitrile rubbers, colouring matter, flow control agents, flame inhibitors, and mould lubricants. Suitable extenders, fillers, and reinforcing materials are, for example, glass fibres, carbon fibres, fibres of aromatic polyamides, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, impregnating and casting resins, powder coatings, moulding compositions, putties and sealing compounds, potting and insulating compounds for the electrical industry, but especially adhesives and as primers for adhesives.

The compositions of this invention are preferably cured by heating them at a temperature in the range 100° C. to 180° C., especially 100° to 130° C. Usually, heating for 30 to 120 minutes suffices to achieve curing.

The following Examples illustrate the invention. Parts are by weight.

Ureas used in these Examples were prepared as follows:

N-(2-Hydroxyphenyl)-N',N'-dimethylurea

Benzoxazolinone (200 g) was stirred with 1 liter of a 33% solution of dimethylamine in industrial alcohol at 50° C. for 48 hours. The alcohol and unchanged dimethylamine were distilled off under reduced pressure at below 60° C. and the product was recrystallised from a 1:1 by volume mixture of isopropanol and light petroleum ether (b.pt. 60°–80° C.). It melted at 148° C. (decomp.) as measured on a Kofler bench.

N-(2-Hydroxy-4-nitrophenyl)-N',N'-dimethylurea

Benzoxazolinone (25 g) was added in portions to concentrated nitric acid (120 ml) heated to 50° C. at a rate such that the temperature was maintained at about 50° C. After the addition had been completed the mixture was stirred for 20 minutes at 50° C., then poured into water (1 liter). The 6-nitrobenzoxazolinone which separated was filtered off, washed with water, and then dried under reduced pressure (15 mm) at 100° C. Its m.pt. was 248° C.

6-Nitrobenzoxazolinone was converted into the urea as described above for benzoxazolinone, using 267 g of the nitro analogue.

N-(5-Chloro-2-hydroxyphenyl)-N',N'-dimethylurea

Urea (1.67 mole) and 2-amino-4-chlorophenol (1 mole) were heated together at 180° C. for 2 hours under nitrogen. The melt was then cooled to 100° C., 200 ml of N-HCl were added cautiously, and the 5-chlorobenzoxazolinone was filtered off, washed with water, and dried under reduced pressure (15 mm) at 100° C. Its m.pt., on recrystallisation from water, was 185° C. This benzoxazolinone (263 g) was converted into the desired urea by heating with alcoholic dimethylamine as described above. The urea had m.pt. 164° C. after recrystallisation from a 1:1 by volume mixture of isopropanol and light petroleum ether (b.pt. 60°–80° C.).

N-(2-Hydroxy-5-nitrophenyl)-N',N'-dimethylurea

This was prepared in a similar manner as the 5-chloro-2-hydroxyphenyl analogue, by fusing 2-amino-4-nitrophenol and urea to form 5-nitrobenzoxazolinone (m.pt. 215° C. after recrystallisation from acetone), and then heating with alcoholic dimethylamine as above: it was not recrystallised.

N-(3,5-Dimethyl-2-hydroxyphenyl)-N',N'-dimethylurea

This was prepared in a similar manner as the 5-chloro-2-hydroxyphenyl analogue, from 2-amino-4,6-dimethylphenol, urea, and dimethylamine. The intermediary benzoxazolinone was not recrystallised. The urea had m.pt. of 140° C. (decomp.) on crystallising out from the alcoholic reaction medium.

N-(4-Chloro-2-hydroxyphenyl)-N',N'-dimethylurea

Benzoxaxolinone was converted into its 6-chloro derivative by chlorination in acetic acid, and this was then treated with dimethylamine in industrial alcohol as above. The m.pt. of the urea was 178° C. (decomp.).

N-(2-Hydroxyphenyl)-N',N'-diethylurea

Benzoxazolinone (1 mole) was stirred with 2 moles of diethylamine (dissolved in industrial alcohol) at 50° C. for 48 hours, then the alcohol and excess of diethylamine were distilled off under reduced pressure at below 60° C. The residue was taken up in acetone, the desired product was precipitated by adding water and then it was filtered off and dried under reduced pressure at 80° C.

N-(2-Hydroxyphenyl)-N',N'-pentamethyleneurea

Benzoxazolinone (1 mole) was stirred with 2 moles of piperidine, dissolved in methanol, for 48 hours at 50° C. The product separated out on evaporation of some of the solvent and cooling, and was used directly.

N-(2-Hydroxyphenyl)-N'-methylurea

Benzoxazolinone (1 mole) was stirred with 2 moles of methylamine (25% aqueous solution) for 48 hours at 50° C., then some of the water and the excess of methylamine were distilled off at 60° C. under reduced pressure. The desired urea crystallised out on cooling; it had m.pt. 130° C. (decomp.).

N-(2-Hydroxyphenyl)-N'-methyl-N'-(2-hydroxyethyl)urea

Benzoxalinone (202 g) and N-methylethanolamine (133 g) were stirred and heated at 75° C. for 3 hours, then cooled to 65° C. and methanol (50 ml) was added. The mixture was cooled to ambient temperature and diethyl ether (750 ml) was added. The precipitate was filtered off and recrystallised from methanol to give the desired urea which had a m.pt. of 128° C. (decomp.).

N-(4-Chloro-2-hydroxyphenyl)-N'-methyl-N'-(2-hydroxyethyl)urea

6-Chlorobenzoxazolinone (20 g) and N-methylethanolamine (17.7 g) in methanol (40 ml) were stirred and heated at 65° C. for 3 hours. The mixture was cooled to ambient temperature, filtered, and the residue was washed with diethyl ether to give the desired urea which melted at 178° C. (decomp.).

N-(4-Bromo-2-hydroxyphenyl)-N',N'-dimethylurea

Benzoxazolinone (45 g) was dissolved in chloroform (400 ml) at 50° C. and treated dropwise with bromine (26.63 g). The mixture was allowed to stand at room temperature for 16 hours, and crystals of 6-bromobenzoxolinone (m.pt. 172° C.) were filtered off.

6-Bromobenzoxazolinone (35.1 g) was stirred with 55 ml of a 38% solution of dimethylamine in methanol at 60° C. for 2½ hours. The mixture was cooled and filtered, and the precipitate was washed with cold methanol to give the desired urea (17.9 g), m.pt. 178° C. (decomp.).

'Epoxide Resin I' denotes a polyglycidyl ether of 2,2-bis(4-hydroxyphenyl)propane having a 1,2-epoxide content of 5.16 equivalents per kilogram and a viscosity at 21° C. of 24.5 Pa s.

'Epoxide Resin II' denotes bis(4-(diglycidylamino)-phenyl)methane, having a 1,2-epoxide content of 8.0 equivalents per kilogram.

The accelerating effect is shown, as is conventional in this art, by reduction in the time taken for the composition to gel, prior to curing. Except where otherwise stated, gel times were determined by placing approximately 0.1 g of the mixture onto a metal block heated to the indicated temperature, and observing the time taken for gelation to occur.

EXAMPLE 1

This Example shows the curing effect on Epoxide Resin I, as demonstrated by the gel time (in minutes unless otherwise stipulated) of N-(2-hydroxyphenyl)-N',N'-dimethylurea incorporated by roller-mixing at room temperature in various concentrations and at various temperatures.

| Gel time at | Parts per 100 parts of Epoxide Resin I | | | | | |
|---|---|---|---|---|---|---|
| | 5 | 7 | 10 | 13 | 16 | 20 |
| 120° C. | 40 | 25 | 17.5 | 12.5 | 9.5 | 9.5 |
| 100° C. | >120 | 120 | 75 | 65 | 50 | 35 |
| 80° C. | >240 | >240 | >240 | >240 | >240 | >240 |
| 40° C. | 8 weeks | 6 weeks | 4 weeks | 25 days | 21 days | 18 days |

EXAMPLE 2

N-(2-Hydroxyphenyl)-N',N'-dimethylurea in various proportions was added to Epoxide Resin II heated to 70°–80° C. It dissolved readily. The gelation times (in minutes unless otherwise stipulated) at various temperatures of the mixture were

| Gel time at | Parts per 100 parts of Epoxide Resin II | | |
|---|---|---|---|
| | 2½ | 5 | 10 |
| 150° C. | 8½ | 3 | 1½ |
| 130° C. | 20 | 7 | 2½ |
| 110° C. | — | 30 | — |
| 100° C. | 180 | 68 | 28½ |
| 90° C. | — | approx. 2 hours | — |
| 80° C. | — | more than 12 hours | — |

— denotes not tested

EXAMPLE 3

In this Example a composition of this invention is heat-cured, being used to form an adhesive joint.

Aluminium alloy sheets, 1.63 mm thick and available under the designation "2L 73 Alclad," were degreased, pickled as prescribed in the British Ministry of Aviation Aircraft Process Specification DTD-915 B, washed in running water, and dried ("Alclad" is a registered Trade Mark). A mixture of 100 parts of Epoxide Resin I, 13 parts of N-(2-hydroxyphenyl)-N',N'-dimethylurea, 2.5 parts of aluminum powder (passing 200 mesh, British Standard 410), and 0.5 part of a commercially-available thixotropic agent comprising asbestos was prepared by triple roller mixing and used to prepare single lap joints 2.54 cm × 1.27 cm, the mixture being cured by heating for 1 hour at 120° C. The shear strength of the bond was 25 MPa.

EXAMPLE 4

The following mixtures were prepared by means of a triple roller mixer, the figures denoting parts:

| | A | B | C | D | E | F | G | H |
|---|---|---|---|---|---|---|---|---|
| Epoxide Resin I | 100 | 100 | 100 | 100 | 100 | 100 | 100 | 100 |
| N—(2-Hydroxyphenyl)-N',N'—dimethylurea | 13 | 0 | 0 | 0 | 0 | 0 | 0 | 0 |
| N—(2-Hydroxy-4-nitrophenyl)-N',N'—dimethylurea | 0 | 17 | 0 | 0 | 0 | 0 | 0 | 0 |
| N—(5-Chloro-2-hydroxyphenyl)-N',N'—dimethylurea | 0 | 0 | 15.5 | 0 | 0 | 0 | 0 | 0 |
| N—(2-Hydroxy-5-nitrophenyl)-N',N'—dimethylurea | 0 | 0 | 0 | 17 | 0 | 0 | 0 | 0 |
| N—(3,5-Dimethyl-2-hydroxyphenyl)-N',N'—dimethylurea | 0 | 0 | 0 | 0 | 15 | 0 | 0 | 0 |
| N—(4-Chloro-2-hydroxyphenyl)-N',N'—dimethylurea | 0 | 0 | 0 | 0 | 0 | 15.5 | 0 | 0 |
| N—(4-Chlorophenyl)-N',N'—dimethylurea | 0 | 0 | 0 | 0 | 0 | 0 | 15 | 0 |
| 2,4-Bis(N,N—dimethylureido)toluene | 0 | 0 | 0 | 0 | 0 | 0 | 0 | 10 |

The proportion of each urea was chosen so that it corresponds to an equivalent amount of dimethylamine, since it is believed (although the utility of this invention does not depend on the truth of this belief) that the ureas employed in the compositions of this invention exert their effect by decomposing on heating to liberate dimethylamine (when $R^2$ and $R^3$ both denote methyl) or a corresponding secondary amine (when $R^2$ and $R^3$ do not both denote methyl) which reacts with the epoxide resin.

The gelation times at various temperatures of these mixtures were (times in minutes, unless otherwise stipulated)

| | A | B | C | D | E | F | G | H |
|---|---|---|---|---|---|---|---|---|
| 120° C. | 12.5 | 20 | 13 | 8 | 16 | 14 | 30 | 25 |
| 100° C. | 65 | 105 | 47 | 17 | 75 | 65 | — | — |
| 80° C. | 330 | 330 | — | — | — | — | — | — |
| 40° C. | 25 days | 14 days | — | — | 10 days | >14 days | — | — |
| 25° C. | — | — | — | 30 days | — | — | — | — |

— denotes not tested

It will be seen that the compositions of this invention (mixtures A to F) gel more rapidly at 120° C. than do those of the prior art (mixtures G and H) but have desirably long storage lives at room temperature.

EXAMPLE 5

In this Example the heat distortion point of a cured epoxide resin composition obtained using a urea of formula V is compared with that of an analogous composition obtained using a urea known in the prior art as a curing agent. The term "Martens value" denotes that obtained by a modification of the D.I.N. procedure wherein a smaller sample, viz, 76 mm × 19 mm × 3.2 mm (compared with a sample size of 120 mm × 15 mm × 10 mm specified in the D.I.N. procedure) and a maximum fibre stress of 1225 kPa (compared with the D.I.N. specified 4900 kPa) were employed. Results obtained by this modified procedure, although only approximating to those obtained in the D.I.N. procedure, provide, however, mutually comparable results.

A solution of N-(2-hydroxyphenyl)-N',N'-dimethylurea (1 g) in 10 g of Epoxide Resin I was prepared by heating to 60° C., and a sample was cast and curing by heating at 100° C. for 2 hours and then 1 hour at 150° C. The "Martens value" of the cured sample was 110° C. For comparison, the procedure was repeated, using 1 g of N-(4-chlorophenyl)-N',N'-dimethylurea but it was necessary, in order to dissolve this urea, to heat the mixture to 100° C. The cured sample was somewhat brittle, and its "Martens value" was 89° C.

EXAMPLE 6

This Example illustrates the acceleration by dicyandiamide of the curing of an epoxide resin by means of ureas of formula V.

The following compositions were prepared by triple roller mixing, the figures denoting parts. It will be seen that incorporation of dicyandiamide brought about a reduction in gelation time without diminishing the storage life.

|  | I | J | K | L |
|---|---|---|---|---|
| Epoxide Resin I | 100 | 100 | 100 | 100 |
| N—(2-Hydroxyphenyl)-N',N'—dimethylurea | 13 | 13 | 0 | 0 |
| N—(4-Chloro-2-hydroxyphenyl)-N',N'—dimethylurea | 0 | 0 | 15.5 | 15.5 |
| Thixotropic agent* | 5 | 5 | 5 | 5 |
| Dicyandiamide | 0 | 2 | 0 | 2 |
| Gel time at 120° C. (minutes) | 12½ | 9 | 14 | 10 |
| Storage life at 40° C. | 3½ weeks | 3½ weeks | — | several weeks |

*a commercially available, asbestos-based product

EXAMPLE 7

This Example illustrates the acceleration by a urea of formula V of the curing of an epoxide resin by means of dicyandiamide and demonstrates that it is more effective than a urea of the prior art.

The following compositions were prepared by triple roller milling, the figures denoting parts:

|  | M | N | O | P |
|---|---|---|---|---|
| Epoxide Resin I | 100 | 100 | 100 | 100 |
| Thixotropic agent: | | | | |
| silica aerogel | 5 | 5 | 5 | 5 |
| glycerol | 1 | 1 | 1 | 1 |
| Dicyandiamide | 7 | 7 | 7 | 7 |
| N—(2-Hydroxyphenyl)-N',N'—dimethylurea | — | 4 | — | — |
| N—(4-Chlorophemyl)-N',N'—dimethylurea | — | — | 4 | 8 |
| Gel time at 120° C. (minutes) | >150 | 14 | 20 | 15 |

It will be seen that the composition of this invention (N) gelled more rapidly than those of the prior art (M, O, P).

EXAMPLE 8

A composition, prepared by mixing on a triple roll mill 100 parts of Epoxide Resin I, 16 parts of N-(2-hydroxyphenyl)-N',N'-pentamethyleneurea, and 5 parts of the thixotropic agent used in Example 6, gelled at 120° C. in 38 minutes.

EXAMPLE 9

An aliquot of a composition prepared as in Example 8 but containing 14.4 parts of N-(2-hydroxyphenyl)-N',N'-diethylurea had not gelled after heating at 90° C. for 2 hours, but a further aliquot, heated at 120° C., gelled in 67 minutes.

EXAMPLE 10

An aliquot of a composition prepared as in Example 8 but containing 12 parts of N-(2-hydroxyphenyl)-N'-methylurea had not gelled after heating at 120° C. for 3½ hours, but a further aliquot, heated to 170° C., gelled in 16 minutes.

EXAMPLE 11

A composition, prepared by mixing on a triple roll mill 100 parts of Epoxide resin I, 25 parts of N-(2-hydroxyphenyl)-N'-methyl-N'-(2-hydroxyethyl)urea, and 5 parts of the thixotropic agent used in Example 6, gelled in 15½ minutes at 120° C. and had a storage life of 21 days at 40° C.

EXAMPLE 12

Example 11 was repeated, replacing the urea used in that Example by 25 parts of N-(4-chloro-2-hydroxyphenyl)-N'-methyl-N'-(2-hydroxyethyl)urea. The mixture gelled after 24 minutes at 120° C. and after 110 minutes at 100° C. It had a storage life of 40 days at 40° C.

EXAMPLE 13

Example 11 was repeated, replacing the urea used in that Example by 18.5 parts of N-(4-bromo-2-hydroxyphenyl)-N',N'-dimethylurea. The mixture gelled after 15 minutes at 120° C. and also after 66 minutes at 100° C. It had a storage life of 40 days at 40° C.

EXAMPLE 14

Epoxide resin I (100 parts), N-(2-hydroxyphenyl-N',N'-dimethylurea (10 parts), 2 parts of the thixotropic agent used in Example 6, and the indicated amount of an accelerator were blended on a triple roll mill. Gel times were determined by placing a 1 g sample in a test tube heated in an oil bath at 120° C., and manually determining the onset of gelation. Details of the accelerator, and gel times, are shown in the following table:

| Accelerator | | Gel time at 120° C. |
|---|---|---|
| Type | Parts | (minutes) |
| None | — | 10 |
| Adipic acid dihydrazide | 4.0 | 6 |
| Isophthalic acid dihydrazide | 4.0 | 7 |

What is claimed is:
1. Heat-curable compositions comprising
(a) an epoxide resin and
(b) an effective amount of a urea of formula

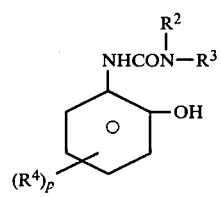

where
$R^2$ and $R^3$ each denote an alkyl, cycloalkyl, alkenyl, cycloalkenyl, or aralkyl group, which may be substituted by a halogen atom, a hydroxyl group, or a cyano group, with the proviso that $R^2$ may alternatively denote a hydrogen atom, or $R^2$ and $R^3$ together with the attached nitrogen atom denote a heterocyclic ring containing 3 to 5 carbon atoms, and optionally one oxygen atom, in the ring, $R^4$ denotes —$NH_2$, —$NO_2$, —Cl, —Br, or alkyl of 1 to 10 carbon atoms, and p denotes zero, 1, or 2.

2. The compositions of claim 1 in which $R^2$ and $R^3$ each denote an alkyl group of 1 to 6 carbon atoms, a hydroxyalkyl group of 2 to 4 carbon atoms, a cycloalkyl group of 3 to 7 carbon atoms, an alkenyl group of 2 to 4 carbon atoms, or an aralkyl group of 7 to 9 carbon atoms.

3. The compositions of claim 1 in which $R^2$ and $R^3$ each denote a methyl group, or $R^2$ denotes a methyl group and $R^3$ denotes a 2-hydroxyethyl group.

4. The compositions of claim 1 in which p denotes zero, or 1, with $R^4$ denoting —$NO_2$, —Cl, or —Br, or 2, with each $R^4$ denoting a methyl group.

5. The compositions of claim 1 in which the urea of formula V is N-(2-hydroxyphenyl)-N',N'-dimethylurea, N-(2-hydroxy-4-nitrophenyl)-N',N'-dimethylurea, N-(4-chloro-2-hydroxyphenyl)-N',N'-dimethylurea, N-(5-chloro-2-hydroxyphenyl)-N',N'-dimethylurea, N-(2-hydroxy-5-nitrophenyl)-N',N'-dimethylurea, N-(3,5-dimethyl-2-hydroxyphenyl)-N',N'-dimethylurea, N-(2-hydroxyphenyl)-N'-methyl-N'-(2-hydroxyethyl)urea, or N-(4-chloro-2-hydroxyphenyl)-N'-methyl-N'-(2-hydroxyethyl)urea.

6. The compositions of claim 1 which contain a heat-curing amount of the urea of formula V for (a).

7. The compositions of claim 1 which further contain
(c) a minor amount by weight, calculated on the weight of the urea of formula V, of an accelerator for the heat-curing, selected from dicyandiamide, carboxylic acid hydrizides, succinimide, cyanoacetamide, 1-cyano-3-(lower alkyl)guanidines, the lower alkyl group or groups containing 1 to 3 carbon atoms, imidazoles, and salts of carboxylic acids with tertiary amines,
(b) with (c) together constituting a heat-curing amount for (a).

8. The compositions of claim 1 which further contain
(d) a major amount by weight, calculated on the weight of the urea of formula V, of a heat-curing agent selected from dicyandiamide, carboxylic acid hydrazides, succinimide, cyanoacetamide, 1-cyano-3-(lower alkyl)guanidines, the lower alkyl group or groups containing 1 to 3 carbon atoms, imidazoles, and salts of carboxylic acids with tertiary amines,
(d) with (b) together constituting a heat-curing amount for (a).

9. A process for curing an epoxide resin, comprising heating a composition of claim 1.

* * * * *